April 5, 1927.  A. W. LIMONT, JR  1,623,798
MULTISTAGE FLUID COMPRESSOR
Filed June 26, 1926  3 Sheets-Sheet 1
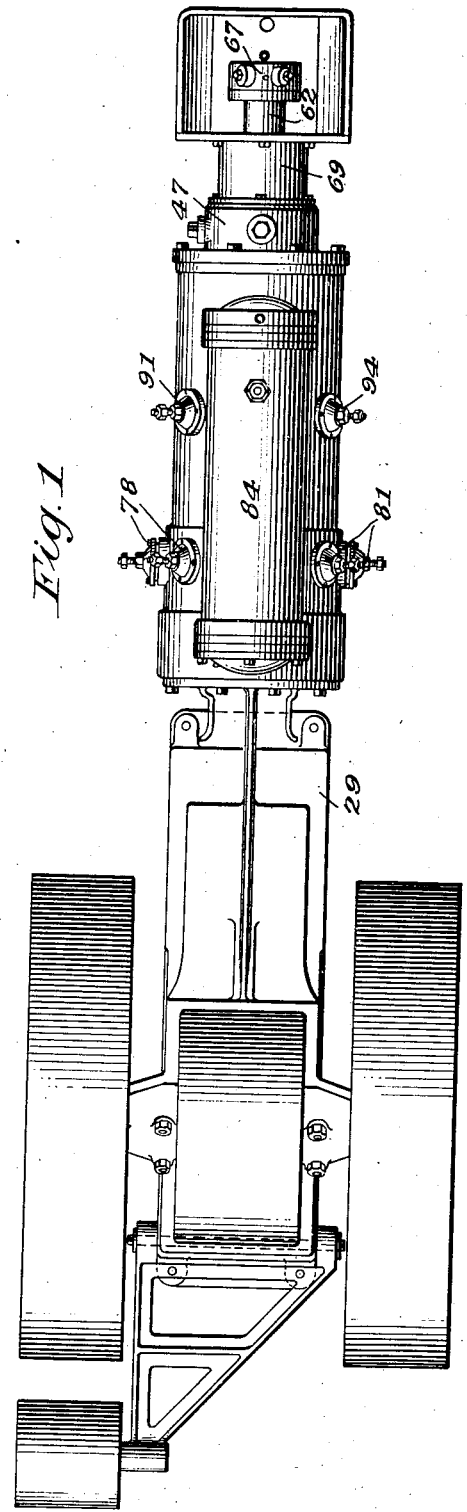
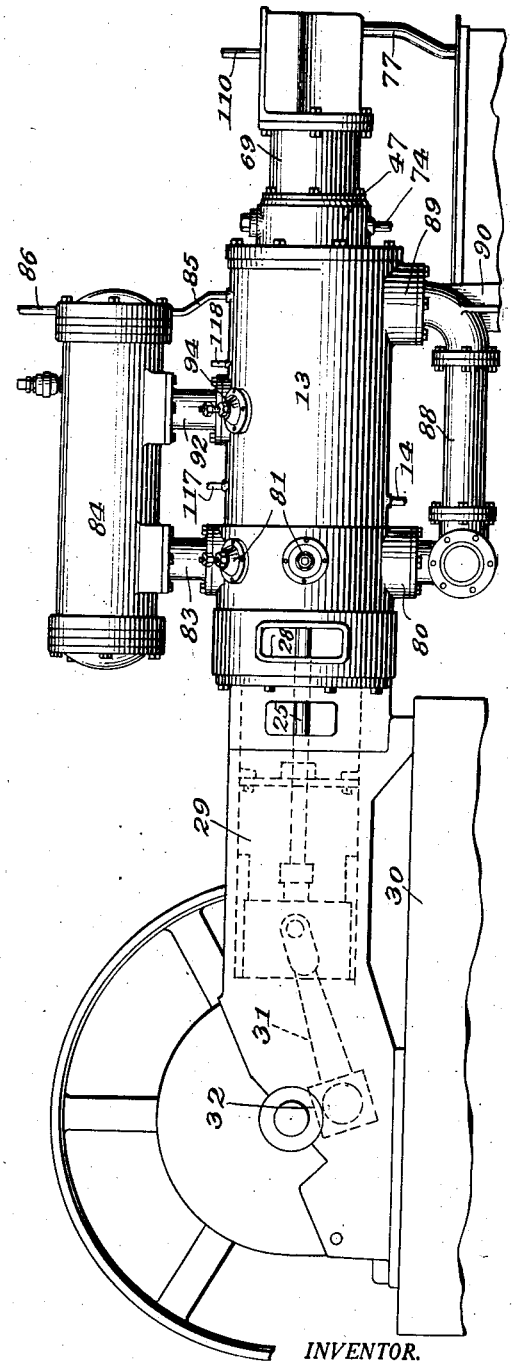
INVENTOR.
Alexander W. Limont, Jr.
BY
Chamberlain & Neueman
ATTORNEYS.

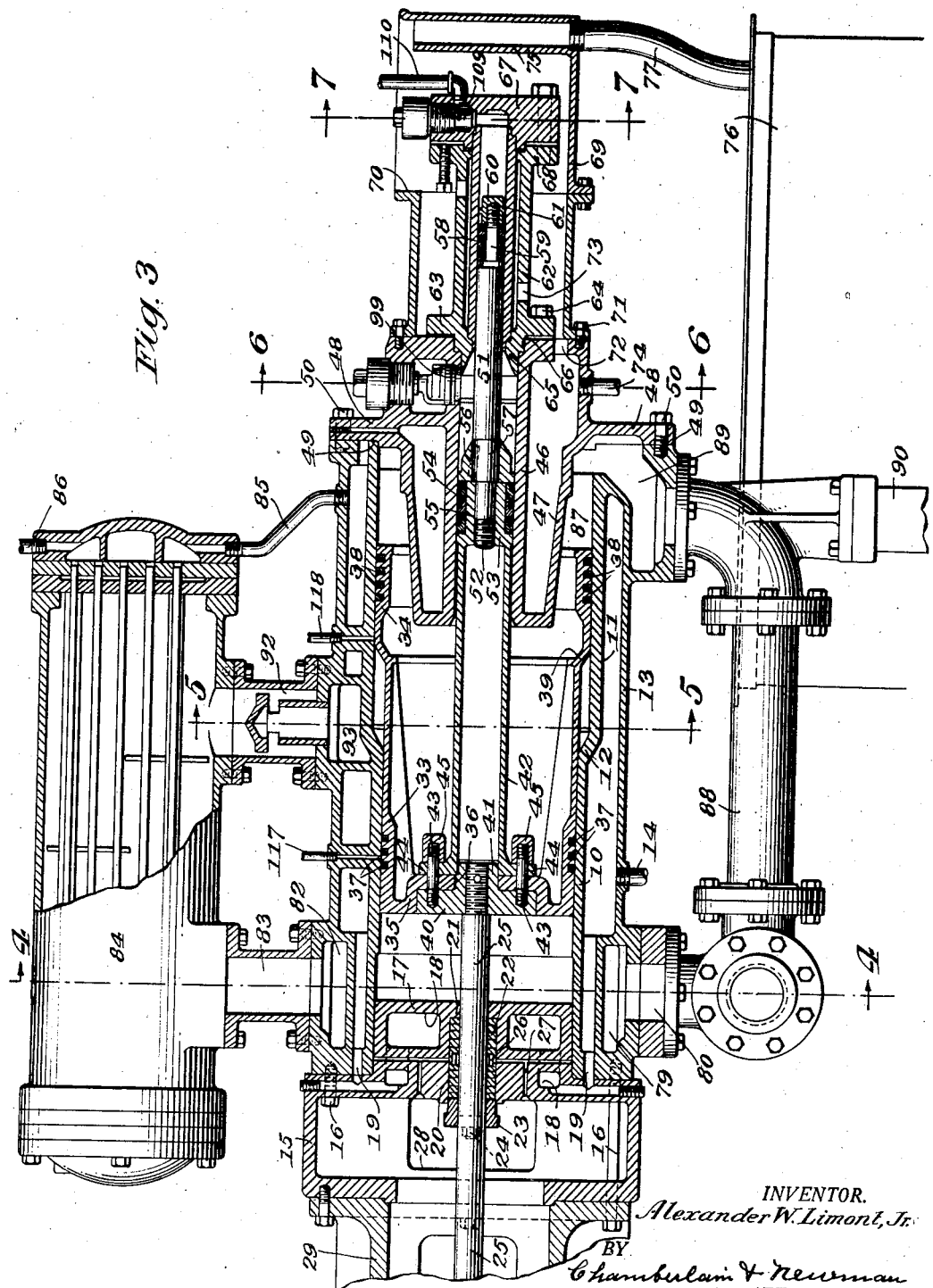

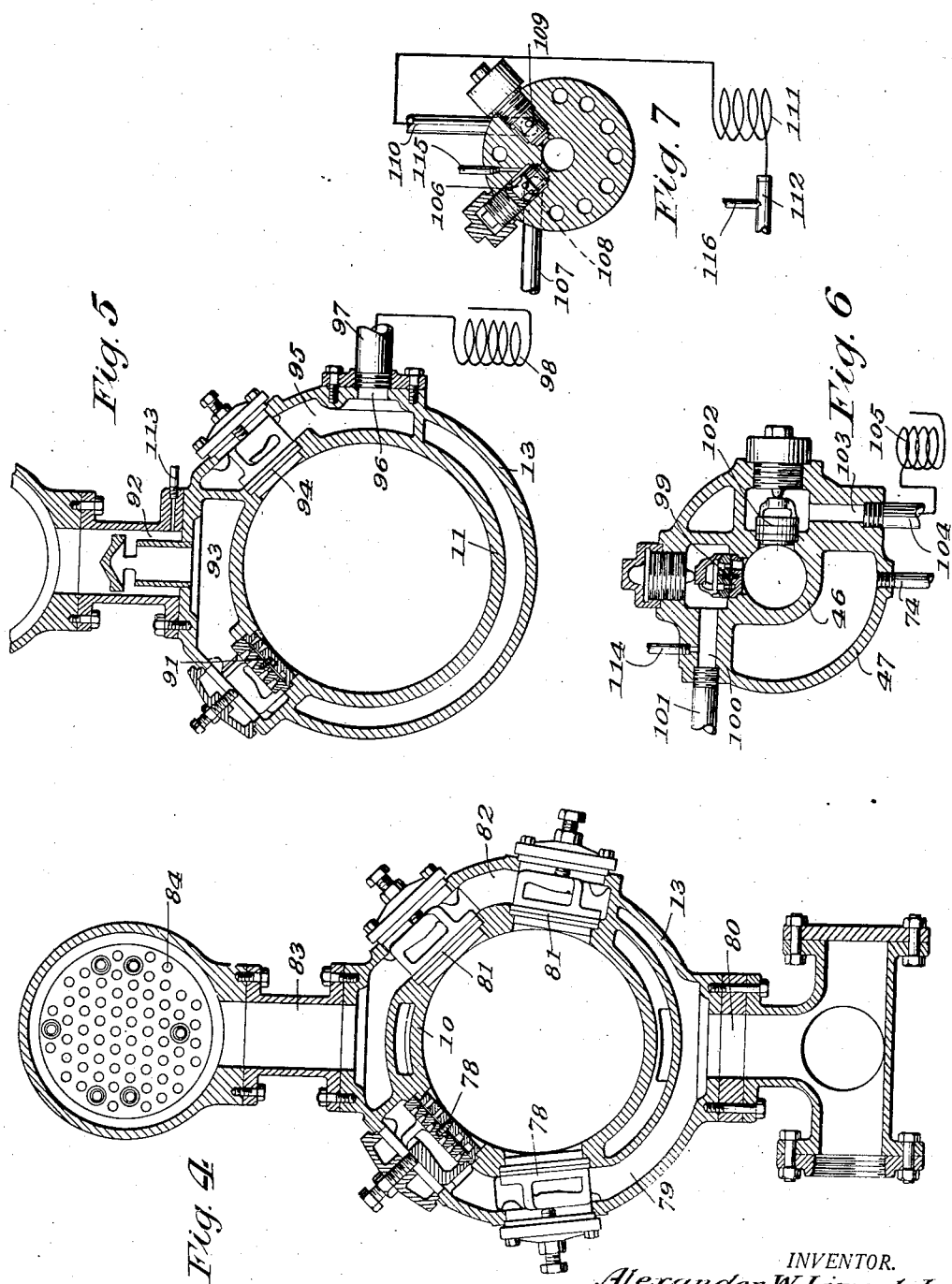

Patented Apr. 5, 1927.

1,623,798

UNITED STATES PATENT OFFICE.

ALEXANDER W. LIMONT, JR., OF BRIDGEPORT, CONNECTICUT, ASSIGNOR TO THE NORWALK COMPANY, OF SOUTH NORWALK, CONNECTICUT, A CORPORATION OF DELAWARE.

MULTISTAGE FLUID COMPRESSOR.

Application filed June 26, 1926. Serial No. 118,624.

The present invention relates to multistage fluid compressors and has for an object to provide a compressor in which the compressing stages are so arranged as to afford a proper distribution of compressive work in relatively equal proportions per stage, and an equalization of mechanical effort thruout the rotative cycle.

Another object is to provide against leakage of the expensive and dangerous fluid employed, and to provide positive means for collecting any leakage past the pistons and return the same to the intake port, thus preventing any possibility of waste of the fluid.

A further object is to provide an improved assembly by means of which the parts may be readily assembled and accurately aligned, and conveniently disassembled to remove the pistons, and to this end it is proposed to provide a piston unit construction including the pistons of the several stages and secured at one point to the piston rod whereby removal of the complete piston assembly may be effected by disconnecting at this point, and in re-assembling, the accurate relation of the pistons to each other and to the cylinder structure will be assured. It is also an object to provide a comparatively short over-all piston assembly providing compactness, unusual rigidity, and freedom from vibration.

A still further object is to provide improved water jacketing means for the perfect circulation of cooling water.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a top plan view of a four-stage compressor according to the present embodiment of the invention;

Fig. 2 is a side elevation thereof;

Fig. 3 is a longitudinal sectional view, enlarged, of the several compressing stages; and Figs. 4, 5, 6, and 7 are sectional views taken respectively along the lines 4—4, 5—5, 6—6, and 7—7 of Fig. 3, of the several compressing stages.

Similar reference characters indicate corresponding parts thruout the several figures of the drawings.

Referring to the drawings, the four-stage compressor according to the present embodiment of the invention, comprises a two-stepped water-jacket cylinder 10—11 having two connecting co-axial bores of different diameters connected by an annular beveled step-portion 12 constituting an end wall of the second compression chamber, as will hereinafter more fully appear. The outer wall 13 surrounds the cylinders 10—11 in annular spaced relation and constitutes a water jacket to which water is admitted through an intake pipe 14. At the forward, or frame end, the cylinder is closed by a hollow cylinder-head 15 secured by bolts 16 and provided with a reduced diameter portion 17 fitted into the end of the cylinder portion 10 forming the end wall of the first compression chamber. The cylinder-head 15 and its portion 17 are provided with water jacketing spaces 18 in communication with the water jacketing space of the cylinders 10—11 through communicating passages 19. The cylinder-head is provided with a central bore 20 flanged at its inner end as at 21, and provided with a series of packing rings 22 locked in place by an end gland 23 and bolts 24, and through which the piston rod 25 is adapted to reciprocate. Where it is imperative that there should be no leakage of the gas to the outside atmosphere, the head through which the piston rod passes is provided with a space 26 having the packing rings 22 at each side; and by means of suitable passages 27 connecting with this space, any gas leaking along the rod from the first compression cylinder is caught and conveyed back to the intake port, or other such disposition made of it as may be desired. Large openings 28 in the head 15 permit of convenient access to the piston rod packing rings. The piston rod extends forwardly through a frame 29 bolted to the head 15 and mounted upon a suitable pedestal 30, and said rod is connected at its end to the crank arm 31 driven from the fly wheel crank shaft 32.

Each of the bores of the cylinders 10—11 are provided with a single differentially stepped piston 33 and 34 in the form of a hollow integral tube provided at its forward end with an annularly recessed flanged end wall 35 provided with a central aperture 36. The steps of the pistons 33 and 34 correspond in diameter with the bores of the cylinders in which they are fitted, and are provided with suitable packing rings 37 and 38. A beveled connecting portion 39 between the pistons corresponds to the inner surface of the cylinder portion 12 and constitutes the piston end of the second stage compression chamber.

The piston rod 25 passing into the first stage compressing space from the cross-head is provided with a large flange 40 whose outside diameter and axial thickness is an exact fit within the recessed end 35 of the piston 33—34, and is provided with a reduced projection 41 whose diameter is an exact fit within the machined end of the third stage tubular piston body 42. Bolts or studs 43 are secured in the flange 40 and pass through holes in the end wall 35 and the flange 44 of the piston body 42; and by means of nuts 45, the piston rod flange 40, the first and second compression stage pistons 33 and 34, and the third stage piston body 42 are all clamped together into one integral whole and in exact axial relation to the several cylinders in which they operate. The compression of the fluid in both the first and second stage of compression occurs as the piston travels toward the power or crank end of the compression cycle or stroke, both stages being single acting.

The third stage piston body 42 is relatively long and extends axially in spaced relation within the hollow piston body 33—34 where it is engaged at its end in the third intermediate stage compression cylinder, the interior space of said piston 33—34 allowing the introduction of the cylinder barrel 46 and water jacket 47 of said third compression stage.

The third stage cylinder and water jacketing space 46—47 is provided with a wide flange 48 cast integrally therewith, and at its marginal portion is machined, as at 49, to accurately fit the end of the cylinder 11, being secured thereto by bolts 50, this flange providing a means of correctly aligning the third stage cylinder bore with the first and second stage cylinder bores, and also acts as a closing head for this end of the cylinder.

The fourth stage compressing piston 51 is provided with a shouldered threaded stud 52 screwed into the outer or head end 53 of the third compressing piston 42, and is held in absolute axial alignment with the entire piston assembly by properly machined surfaces. The packing rings of the third stage piston of the built-up type consist of a number of separate "bull" or spacing rings 54 upon which are mounted regular piston rings 55, this assembly being locked in position by means of a flanged beveled collar 56 keyed upon a shouldered portion of the piston 51 and screwed up to a fixed position against the outer end of the third stage piston by means of the threaded stud 52.

The packing rings 58 of the fourth stage piston are of identical type of construction to the third stage piston, and are held in place upon a threaded stud 59 by means of a piston nut 60.

Connecting to the third stage, and in absolute axial tandem alignment with it, is the fourth stage compression chamber, the fourth stage cylinder bushing 61 being secured at its ends within a cylindrical shell 62 annularly spaced therefrom, said shell being provided with a flange 63 secured by bolts 64 to the end of the third stage cylinder, and having a reduced projecting end portion 65 beveled at its inner end in correspondence to the bevel of the collar 56 and fitted exactly into the recessed and machined end 66 of the third cylinder bore. A cylinder-head 67 bolted to the flanged end 68 of the shell 62 closes the end of the fourth stage compression chamber.

A water reservoir 69 having a top opening 70, and surrounding the fourth stage in spaced relation, is secured to the third stage cylinder by bolts 71 and is in connection with the water jacketing space of the third stage through a passage 72, water being admitted from the reservoir to the space between the fourth stage cylinder bushing 61 and shell 62 through a passage 73. Water is admitted to the third stage water jacket through an intake pipe 74, finally passing into the over-flow pipe 75 in the reservoir 69 and being returned to the tank 76 through a return pipe 77.

The compression of the fluid in the third and fourth stages takes place as the pistons travel in a direction away from the power end of the machine.

It will be seen from the above description that there are two stages of compression, the first and second, of relatively equal mechanical load value acting towards the power end, and two stages of compression, the third and fourth, also of relatively equal values acting away from the power end, thus embodying the best conditions to equalize the stresses on the crank shaft during each revolution, resulting in a smoothly running compressor and one that is free from excessive variation in the driving power required.

Each of the compressing spaces is provided with the proper number of inlet and discharge valves to permit the fluid to enter upon the suction stroke and to be expelled upon the return stroke in the manner usual in this type of apparatus.

The inlet valves 78 for the first stage (Figs. 3 and 4) are provided in the supply space 79 between the supply port 80 and the first stage compressing space, the discharge valves 81 being between the compressing space and the discharge space 82 from which the compressed fluid is conveyed through a conduit connection 83 to a first stage intercooler 84. Water is supplied to this intercooler from the water jacket space of the first and second cylinders by means of a pipe 85, and is returned to the tank 76 by means of an over-flow pipe 86. The intake port 80, by which fluid enters from the external sources of supply, communicates with the space 87 formed between the back of the hollow differential piston 33—34 and the flange 48 of the closing head, commonly called the "dead space", by means of piping 88 and an inlet opening 89, this pipe being supported in a standard 90 which also acts as a support for the compressor. The object of this connection is two-fold—first, to relieve any pressure that would result from the movement of the piston; and second, to collect any leakage past the pistons and return it to the intake port 80, thus preventing any waste of the fluid handled, often a very expensive or injurious gas.

The inlet valve 91 for the second stage (Figs. 3 and 5) is placed between the water-trapped intake port 92 and inlet space 93 by which the fluid leaves the first stage inter-cooler 84 and the second stage compressing space, the discharge valve 94 being placed between the compressing space and the discharge space 95 and discharge port 96. A pipe 97 conducts the second stage compressed fluid to an inter-cooler, indicated diagrammatically at 98 (preferably a coil submerged in the tank 76). The inlet valve 99 for the third stage (Figs. 3 and 6) is placed between the intake port 100 connected to the second stage inter-cooler 98 by a pipe 101 and the third stage compressing space, the discharge valve 102 being placed between said compressing space and the discharge port 103, the latter being connected by a pipe 104 with the third stage inter-cooler, indicated diagrammatically at 105 (also preferably a coil submerged in the tank 76).

The intake valve 106 for the fourth and final stage (Figs. 3 and 7) is provided between an intake port 108 connected to the third stage inter-cooler 105 by a pipe 107 and the fourth stage compressing space, the discharge valve 109 being placed between said compressing space and a discharge pipe 110 through which it is conducted to an after-cooler, indicated diagrammatically at 111 (preferably a submerged coil) and from which the fourth stage compressed fluid is conducted by a pipe 112 to its point of use.

Lubrication pipes 114 (Fig. 6) and 115 (Fig. 7) are connected to the inlet ports and to the final discharge pipe 112 at points in connection with the compressed fluid after passing through the coolers, and are connected to suitable pressure gauges (not shown) to indicate the fluid pressure of each stage.

The pistons 33 and 34 of the first and second stages are adapted to be lubricated by means of lubrication conduits 117 and 118.

In the commercial operation of compressors handling certain gases, it is very essential that means be provided for easy inspection and cleaning and rapid disassembly and assembly of the piston structures, and this is greatly facilitated in the present construction; also the clearances that is, the distance between the piston and head of the cylinder at the end of the stroke, in this class of apparatus, must be maintained at a very small figure, so that it is desirable, in effecting the quick removal and replacement of the pistons, to maintain the exact original position without affecting this small clearance. This is accomplished in the present machine. To inspect or remove the pistons it is but necessary to remove the back structure by unbolting at the flange 48, removing the fastening nuts 45 by means of a suitable wrench to disconnect the piston unit assembly from the piston rod flange 40, and withdrawing the piston assembly from cylinders 10 and 11.

As the piston rod, with its flange 40, is adjusted once for all in the proper relation to the front head for the clearance desired, the pistons may be removed and replaced an infinite number of times, with the assurance that they will always occupy the exact position necessary to maintain the small clearance desired in each case. An important factor in the maintenance of high efficiency, at all times, is the reduction of gravity wear on the pistons and cylinders, due to the unit assembly of the pistons and the method of support. The fourth stage piston 51 operates in the removable bushing 61, preferably of hardened steel, and which acts as an outboard support, or bearing, for that end of the piston assembly. The opposite end thru the piston rod 25, is supported by the running gear crosshead, the downward wear and pressure of the intermediate and heavier pistons being relieved, holding them perfectly central in their cylinders and permitting the piston rings to function properly.

I have illustrated and described a preferred and satisfactory embodiment of the invention, but it is obvious that changes may be made therein within the spirit and scope thereof as defined in the appended claims.

What I claim and desire to secure by Letters Patent is:

1. In a multi-stage compressor, a cylinder having a stepped bore, a cylinder-head closing the small end, a first stage piston engaging the smaller bore and acting towards said cylinder-head, said first stage piston having a skirt entering the larger bore during the piston's stroke to form therewith an annular space, a second stage piston connected to the skirt of said first stage piston engaging the larger bore and acting towards the step between said bores, the annular space between the larger diameter second stage cylinder and the skirt of said smaller diameter first stage piston constituting the second stage compressing chamber.

2. In a multi-stage compressor, a cylinder having a stepped bore, a cylinder-head closing the small end, a first stage piston engaging the smaller bore and acting towards said cylinder-head, and a second stage piston in integral continuation of said first stage piston engaging the larger bore and acting towards the step between said bores, the annular space between the larger diameter second stage cylinder and the smaller diameter first stage piston constituting the second stage compressing chamber.

3. In a multi-stage compressor, a cylinder having a stepped bore, a cylinder-head closing the small end and having a piston rod bearing, a piston rod slidable in said bearing, a first stage piston connected to said piston rod engaging the smaller bore and acting towards said cylinder-head, said first stage piston having a skirt entering the larger bore during the piston's stroke to form therewith an annular space, and a second stage piston connected to the skirt of said first stage piston engaging the larger bore and acting towards the step between said bores, the annular space between the larger diameter second stage cylinder and the skirt of said smaller diameter first stage piston constituting the second stage compressing chamber.

4. In a multi-stage compressor, a cylinder having a stepped bore, a cylinder-head closing the small end, closure means for the larger end, a first stage piston engaging the smaller bore and acting towards the cylinder-head, said first stage piston having a skirt entering the larger bore during the piston's stroke to form therewith an annular space, a second stage piston connected to the skirt of said first stage piston engaging the larger bore and acting towards the step between said bores, the annular space between the skirt of said larger diameter second stage cylinder and the smaller diameter first stage piston constituting the second stage compressing chamber, the space between said platens and said closure means constituting a dead space.

5. In a multi-stage compressor, a cylinder having a stepped bore, a cylinder-head closing the small end, closure means for the larger end, a first stage piston engaging the smaller bore and acting towards the cylinder-head, said first stage piston having a skirt entering the larger bore during the piston's stroke to form therewith an annular space, a second stage piston connected to the skirt of said first stage piston engaging the larger bore and acting towards the step between said bores, the annular space between the skirt of said larger diameter second stage cylinder and the smaller diameter first stage piston constituting the second stage compressing chamber, the space between said pistons and said closure means constituting a dead space, and fluid conducting means between said dead space and the first compressing stage.

6. In a multi-stage compressor, a cylinder having a stepped bore, a cylinder-head closing the small end, a hollow stepped piston member closed at its small end, including a small diameter first stage piston engaging the smaller bore and acting towards said cylinder-head, and a large diameter second stage piston engaging the larger bore and acting towards the step between said bores, the annular space between the larger diameter second stage cylinder and the smaller diameter first stage piston constituting the second stage compressing chamber.

7. In a multi-stage compressor, a cylinder having a stepped bore, a cylinder-head closing the small end and having a piston rod bearing, removable closure means for the large end, a piston rod slidable in said bearing, a stepped piston member connected to said piston rod at its small end, including a small diameter first stage piston engaging the smaller bore and acting towards said cylinder-head, and a large diameter second stage piston engaging the larger bore and acting towards the step between said bores, the annular space between the larger diameter second stage cylinder and the smaller diameter first stage piston constituting the second stage compressing chamber, said closure means adapted to be removed to permit removal of said piston member from the large diameter end of said cylinder.

8. In a multi-stage compressor, a cylinder having a stepped bore, a cylinder-head closing the small end and having a piston rod bearing, removable closure means for the large end, a piston rod slidable in said bearing, a stepped piston member, connection means between said member and the piston rod for removably connecting said piston to the rod, said means being accessible from the large diameter end of said cylinder, said piston member including a small diameter first stage piston engaging the smaller bore and acting towards said cyclinder-head, and a large diameter second stage piston engaging the larger bore and acting towards the step between said bores, the annular space between the larger diameter second stage cylinder and the smaller diameter first stage piston constituting the second stage compressing chamber, said closure means adapted to be removed to permit removal of said piston member from the large diameter end of said cylinder.

9. In a multi-stage compressor, a cylinder having a stepped bore, a cylinder-head closing the small end and having a piston rod bearing, removable closure means for the large end, a piston rod slidable in said bearing, a hollow stepped piston, connection means between said piston rod and the small end of said piston accessible through the large end of said piston for disconnecting the latter, said piston including a small diameter first stage piston engaging the smaller bore and acting towards said cylinder-head, and a large diameter second stage piston engaging the larger bore and acting towards the step between said bores, the annular space between the larger diameter second stage cylinder and the smaller diameter first stage piston constituting the second stage compressing chamber, said closure means adapted to be removed to permit removal of said piston member from the large diameter end of said cylinder upon disconnection from said piston rod.

10. In a multi-stage compressor, a cylinder having a stepped bore, a cylinder-head closing one end and having a piston rod bearing, closure means for the other end having a central bearing portion, a stepped piston member, a piston rod slidable in said piston rod bearing and connected to said piston, an axial extension on said piston in opposed direction to said piston rod and slidably engaging said central bearing portion of the closure means, said piston member including a small diameter first stage piston engaging the smaller bore and acting towards one end of the cylinder, and a large diameter second stage piston engaging the larger bore and acting towards the step between said bores, the annular space between the larger diameter second stage cylinder and the smaller diameter first stage piston constituting the second stage compressing chamber.

11. In a multi-stage compressor, a plurality of co-axial cylinders including a first and second stage cylinder, a reciprocating piston assembly including first and second stage pistons operating in said respective cylinders to compress fluid in the same direction of reciprocation, a third stage co-axial cylinder and an axial piston extension carried by said piston assembly, engaging said third stage cylinder to compress fluid in the other direction of reciprocation.

12. In a multi-stage compressor, a cylinder having a stepped bore, including first and second stage cylinder portions, a cylinder-head closing the small end, a first stage piston engaging the smaller bore and acting towards said cylinder-head, said first stage piston having a skirt entering the larger bore during the piston's stroke to form therewith an annular space, a second stage piston connected to the skirt of said first stage piston engaging the larger bore and acting towards the step between said bores, the annular space between the skirt of said larger diameter second stage cylinder and the smaller diameter first stage piston constituting the second stage compressing chamber, a third stage co-axial cylinder, and an axial piston extension carried by said piston assembly engaging said third stage cylinder to compress fluid in the direction opposed to the direction of compression in the first and second stages.

13. In a multi-stage compressor, a plurality of co-axial cylinders including a first and second stage cylinder, a reciprocating piston assembly including first and second stage pistons operating in said respective cylinders to compress fluid in the same direction of reciprocation, a third stage co-axial cylinder, and an axial piston extension carried by said piston assembly engaging said third stage cylinder to compress fluid in the other direction of reciprocation, said first and second stage pistons and said third stage cylinder being spaced to provide a dead space behind said first and second stage pistons.

14. In a multi-stage compressor, a cylinder having a stepped bore including first and second stage cylinder portions, a cylinder-head closing the small end, closure means for the large end provided with a central third stage cylinder portion, a first stage piston engaging the smaller bore and acting towards the cylinder-head, said first stage piston having a skirt entering the larger bore during the piston's stroke to form therewith an annular space, a second stage piston connected to the skirt of said first stage piston engaging the larger bore and acting towards the step between said bores, the annular space between the skirt of said larger diameter second stage cylinder and the smaller diameter first stage piston constituting the second stage compressing chamber, and a third stage axial piston extension connection to said first and second stage pistons engaging said third stage cylinder to compress fluid in the direction opposed to the direction of compression in said first and second stages.

15. In a multi-stage compressor, a cylinder having a stepped bore including first and second stage cylinder portions, a cylinder-head closing the small end, a hollow stepped piston assembly closed at its small end, including a small diameter first stage piston engaging the smaller bore and acting towards said cylinder-head, said first stage piston having a skirt entering the larger bore during the piston's stroke to form therewith an annular space, and a larger diameter second stage piston engaging the larger bore and acting towards the step between said bores, the annular space between the skirt of said larger diameter second stage cylinder and the smaller diameter first stage piston constituting the second stage compressing chamber, a third stage cylinder co-axial with said first and second stage cylinders and projecting into the hollow of said first and second stage piston assembly, and a third stage axial piston extension carried by said piston assembly engaging said third stage cylinder to compress fluid in the direction opposed to the direction of compression in said first and second stages.

16. In a multi-stage compressor, a cylinder having a stepped bore, including first and second stage cylinder portions, a cylinder-head closing the small end and having a piston rod bearing, removable closure means for the large end, including a central third stage cylinder portion, a piston rod slidable in said bearing, a stepped piston member connected to said piston rod at its small end, including a small diameter first stage piston engaging the smaller bore and acting towards said cylinder-head, and a large diameter second stage piston engaging the larger bore and acting towards the step between said bores, the annular space between the larger diameter second stage cylinder and the smaller diameter first stage piston constituting the second stage compressing chamber, a third stage axial piston extension carried by said piston member engaging said third stage cylinder to compress fluid in the direction opposed to the direction of compression in the first and second stages, said closure means adapted to be axially removed to permit removal of said piston member from the larger diameter end of said stepped cylinder.

17. In a multi-stage compressor, a cylinder having a stepped bore, including first and second stage cylinder portions, a cylinder-head closing the small end and having a piston rod bearing, removable closure means for the large end, including an inwardly-extending third stage cylinder portion in annular spaced relation to said stepped cylider, a piston rod slidable in said bearing, a hollow stepped piston, connection means between said piston rod and the small end of said piston accessible through the large end of said piston for disconnecting the latter, said piston including a small diameter first stage piston engaging the smaller bore and acting towards said cylinder-head, and a large diameter second stage piston engaging the larger bore and acting towards the step between said bores, the annular space between the larger diameter second stage cylinder and the smaller diameter first stage piston constituting the second stage compressing chamber, and a third stage axial piston extension carried by said piston member engaging said third stage cylinder to compress fluid in the direction opposed to the direction of compression of the first and second stages, said closure means adapted to be removed to permit removal of said piston member from the large diameter end of said cylinder upon disconnection from said piston rod.

18. In a multi-stage compressor, a plurality of coaxial cylinders, including a first and second stage cylinder, a reciprocating piston assembly, including first and second stage pistons operating in said respective cylinders to compress fluid in the same direction of reciprocation, third and fourth stage co-axial cylinders, and an axial piston extension carried by said piston assembly including third and fourth stage pistons engaging the third and fourth stage cylinders to compress fluid in the other direction of reciprocation.

19. In a multi-stage compressor, a stepped cylinder including first and second stage cylinder portions, a reciprocating piston assembly, including first and second stage stepped pistons operating in said respective cylinder portions to compress fluid in the same direction of reciprocation, a stepped cylinder including third and fourth stage cylinder portions in co-axial alignment with said first and second stage cylinders, and an axial stepped piston extension carried by said piston assembly, including third and fourth stage pistons engaging said third and fourth stage cylinders to compress fluid in the other direction of reciprocation.

20. In a multi-stage compressor, a plurality of coaxial cylinders, including a first and second stage cylinder, a reciprocating piston assembly, including first and second stage pistons operating in said respective cylinders to compress fluid in the same direction of reciprocation, third and fourth stage co-axial cylinders, and an axial piston extension carried by said piston assembly, including third and fourth stage pistons engaging the third and fourth stage cylinders to compress fluid in the other direction of reciprocation, said third stage cylinder being spaced with relation to said first and second stage pistons to provide a dead space behind said first and second stage pistons.

21. In a multi-stage compressor, a plurality of co-axial cylinders, including a first and second stage cylinder, a reciprocating piston assembly, including first and second stage pistons operating in said respective cylinders to compress fluid in the same direction of reciprocation, third and fourth stage co-axial stepped cylinders, and an axial piston extension carried by said piston assembly, including a large diameter third stage piston secured at one end to said piston assembly, and a smaller diameter fourth stage piston extending from said third stage piston, said third and fourth stage pistons engaging said third and fourth stage cylinders to compress fluid in the other direction of reciprocation, the annular space between said large diameter third stage cylinder and the smaller diameter fourth stage piston constituting the third stage compressing chamber.

22. In a multi-stage compressor, a plurality of co-axial cylinders, including a first and second stage cylinder, a reciprocating piston assembly, including first and second stage pistons operating in said respective cylinders to compress fluid in the same direction of reciprocation, third and fourth stage co-axial stepped cylinders, including a large diameter third stage piston secured at one end to said piston assembly, and a smaller diameter fourth stage piston removably secured to and extending from said third stage piston, said third and fourth stage pistons engaging said third and fourth stage cylinders to compress fluid in the other direction of reciprocation, the annular space between said large diameter third stage cylinder and the smaller diameter fourth stage piston constituting the third stage compressing chamber.

Signed at Bridgeport, in the county of Fairfield and State of Connecticut, this 24th day of June A. D. 1926.

ALEXANDER W. LIMONT, Jr.